(12) United States Patent
Voss

(10) Patent No.: US 7,055,796 B2
(45) Date of Patent: Jun. 6, 2006

(54) VALVE, ESPECIALLY FOR HYDRAULIC AUTOMOTIVE BRAKE SYSTEMS

(75) Inventor: Christoph Voss, Frankfurt am Main (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 158 days.

(21) Appl. No.: 10/467,730

(22) PCT Filed: Feb. 9, 2002

(86) PCT No.: PCT/EP02/01385

§ 371 (c)(1),
(2), (4) Date: Aug. 12, 2003

(87) PCT Pub. No.: WO02/068250

PCT Pub. Date: Sep. 6, 2002

(65) Prior Publication Data

US 2004/0069964 A1    Apr. 15, 2004

(30) Foreign Application Priority Data

| Feb. 22, 2001 | (DE) | ............................ 101 08 522 |
| Apr. 7, 2001 | (DE) | ............................ 101 17 609 |
| Aug. 22, 2001 | (DE) | ............................ 101 41 135 |
| Aug. 22, 2001 | (DE) | ............................ 101 41 136 |

(51) Int. Cl.
*F16K 31/02* (2006.01)

(52) U.S. Cl. ............................................. 251/129.06
(58) Field of Classification Search ........... 251/129.02, 251/129.06, 57; 310/328, 311; 92/84; 60/545
See application file for complete search history.

(56) References Cited

U.S. PATENT DOCUMENTS

| 4,762,300 | A |   | 8/1988 | Inagaki et al. |
| 4,995,587 | A |   | 2/1991 | Alexius |
| 6,062,532 | A | * | 5/2000 | Gurich et al. ................. 251/57 |
| 6,062,533 | A | * | 5/2000 | Kappel et al. ................ 251/57 |
| 6,333,586 | B1 | * | 12/2001 | Polach et al. ............... 310/328 |
| 6,457,699 | B1 | * | 10/2002 | Stoecklein ............. 251/129.06 |

FOREIGN PATENT DOCUMENTS

| DE |   | 3713697 | * | 11/1988 |
| DE | 41 19 467 | A1 |   | 12/1992 |
| DE | 44 42 649 | C2 |   | 7/1996 |
| DE | 195 00 706 | A1 |   | 7/1996 |
| DE | 197 14 292 | A1 |   | 10/1998 |
| DE | 198 21 768 | C2 |   | 12/1999 |

(Continued)

OTHER PUBLICATIONS

German Search Report of Application No. 101 41 135.9 dated Feb. 6, 2002.

(Continued)

*Primary Examiner*—Tuan Nguyen
(74) *Attorney, Agent, or Firm*—RatnerPrestia

(57) ABSTRACT

The present invention relates to a valve, especially for slip-controlled brake systems in automotive vehicles, with a valve tappet guided in a valve housing and including a valve closure member, with a valve seat facing the valve closure member, and with a piezoelectric element for actuating the valve closure member. A first and a second force transmission element is arranged between the piezoelectric element and the valve tappet, wherein the first force transmission element is made of a high-strength material that elastically deforms the second force transmission element in the direction of the valve tappet when the piezoelectric element is activated electrically.

20 Claims, 3 Drawing Sheets

FOREIGN PATENT DOCUMENTS

| | | |
|---|---|---|
| DE | 198 49 203 A1 | 4/2000 |
| DE | 199 46 003 A1 | 5/2000 |
| DE | 199 39 487 A1 | 10/2000 |
| DE | 199 39 133 A1 | 2/2001 |
| DE | 199 39 476 A1 | 4/2001 |
| EP | 0 477 400 A1 | 4/1992 |
| EP | 0 491 652 A1 | 6/1992 |

OTHER PUBLICATIONS

International Search Report of Application No. PCT/EP02/01385 dated Aug. 1, 2002.

* cited by examiner

VALVE, ESPECIALLY FOR HYDRAULIC AUTOMOTIVE BRAKE SYSTEMS

TECHNICAL FIELD

The present invention relates to a valve, especially for hydraulic automotive vehicle brake systems.

BACKGROUND OF THE INVENTION

A valve with a piezoelectric drive is disclosed in DE 199 46 827 C1 that includes a valve element with an adjusting piston and an actuating piston for controlling fluids. A hydraulic chamber operating as a hydraulic coupler and acting on an annular piston and the actuating piston is arranged between the adjusting piston and the actuating piston. The differently sized end surfaces of the annular piston and the actuating piston cause a stepped translation of the stroke initiated by the piezoelectric drive.

In view of the above, an object of the present invention is to improve upon a valve of the above-mentioned type to such effect that an abrupt change in ratio is avoided, while a relatively simple, miniaturized design is maintained. Another objective is that the valve permits universal application and has an internal sealing as good and simple as possible.

In addition, said valve shall exhibit a constant and comfortable performance in operation irrespective of temperature variations and with a relatively straightforward design.

DETAILED DESCRIPTION OF THE PREFERRED EMBODIMENTS

Initially, all essential features of the invention will be disclosed in the following, being applicable to both embodiments of FIGS. 1 and 2.

Figure 1:
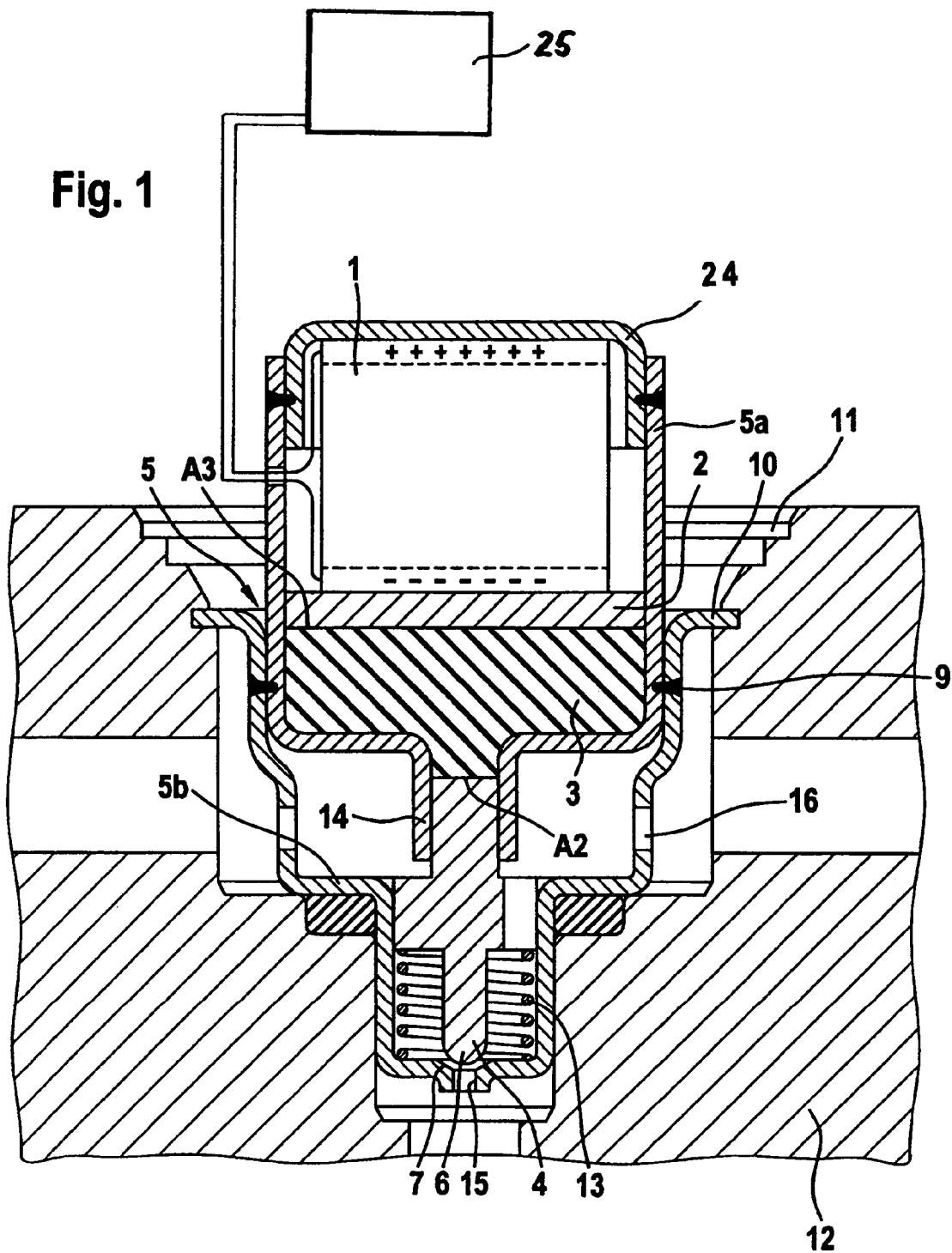
FIG. 1 shows a first embodiment of the invention for a valve opened in its basic position.
Figure 2:
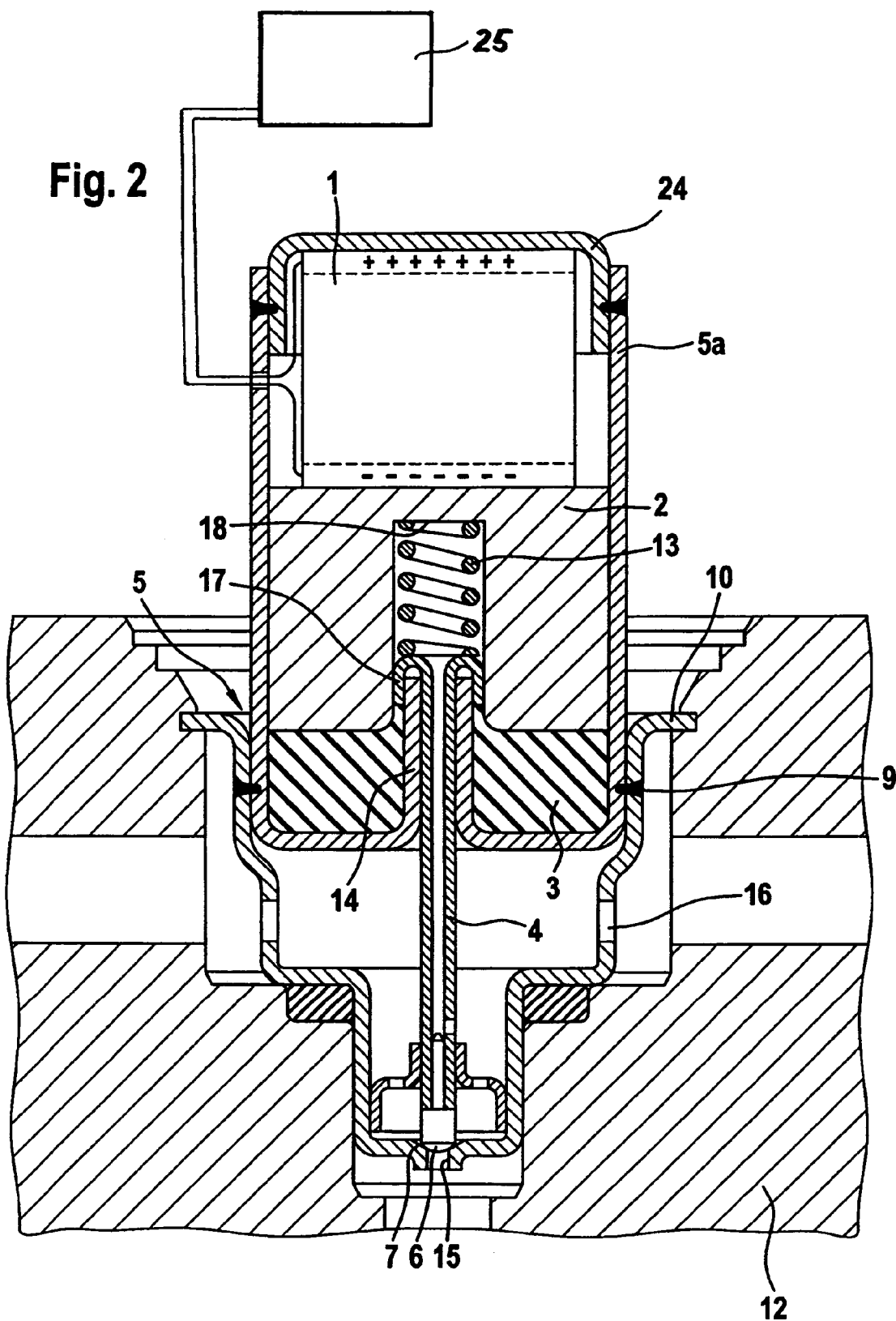
FIG. 2 shows a second embodiment of the invention for a valve closed in its basic position.

Both valves according to FIGS. 1, 2 comprise a valve tappet 4 guided in a valve housing 5 and having at one end a valve closure member 6. Said valve closure member 6 faces a valve seat 7 integrated in the valve housing 5, with the valve closure member 6 being indirectly actuated by means of a piezoelectric element 1. For this purpose, a first and a second force transmission element 2, 3 are arranged between the piezoelectric element 1 and the valve tappet 4 according to the invention, with the first force transmission element 2 being made of a high-strength material, elastically deforming the second force transmission element 3 and moving it in the direction of the valve tappet 4 when the piezoelectric element 1 is electrically activated. For the mechanic translation of the piezoelectric movement in the direction of the valve tappet 4, the contact surface A2 of the second force transmission element 3 that abuts on the end surface of the valve tappet 4 is smaller than the contact surface A3 of the second force transmission element 3 that is elastically deformable for the infinitely variable translation, with contact surface A3 abutting on the first force transmission element 2. In addition, the construction mentioned hereinabove allows that the second force transmission element 3 seals the hydraulically applied inside area of the valve housing 5 in relation to the dry inside area of the valve housing 5 in a simple and absolutely safe fashion, to what end the second force transmission element 3 is favorably made of an elastomer, e.g., any conventional rubber, or a silicone. The second force transmission element 3 can be preloaded in a particularly simple manner by choosing the adjustment depth of the piezoelectric element 1 in the valve housing 5 in order to achieve the necessary sealing effect of the second force transmission element 3 and the desired basic adjustment of the valve tappet 4. To this end the piezoelectric element 1 is supported with its end surface remote from the first force transmission element 2 on a cover 24 that closes the valve housing 5 and is displaceable for adjusting the piezoelectric element 1 in the valve housing 5. After the adjusting operation has been completed, cover 24 is, e.g., welded to the sleeve portion of the valve housing 5. Of course, operative and/or form-locking fixing methods for the cover 24 are also possible. The piezoelectric element 1 is configured as a piezo block in a stack-type construction, and the first force transmission element 2 is configured as a piston that is guided along the inside wall of the valve housing 5 and bears against the second force transmission element 2 designed as a cushion. The proposed design of the valve—in the closed basic position of the valve closure member 6—further permits sensing the hydraulic pressure applied to the valve closure member because there is a hydraulic response to the piezoelectric element 1 by way of the two force transmission elements 2, 3, and the electric change in voltage of the piezoelectric element resulting from the mechanical compressive load application can be converted into a pressure value by means of an electronic evaluating unit. In other words, the mechanical compressive load application causes an electric change in voltage of the piezoelectric element 1. The electronic evaluating unit 25 measures the electric change in voltage of the piezoelectric element 1 and converts it into a pressure value for sensing the hydraulic pressure applied to the valve closure member 6.

The illustrated further details of the valve of FIG. 1 will now be described in the following.

The valve of FIG. 1 shows a valve housing 5 composed of two housing sleeves 5a, 5b that are joined in sections and connected to each other in the joining zone by means of a welded joint 9. The bottom housing sleeve 5b is designed as a stepped housing bowl having its edge 10 that is bent off at right angles wedged into the stepped accommodating bore 11 of a block-shaped valve support member 12. The housing bowl includes at its bottom a first pressure fluid opening 15 with valve seat 7 that is, e.g., made in a stamping process. The hemispherical valve closure member 6 adopts its initial position lifted from valve seat 7 caused by a compression spring 13 compressed between the stepped valve tappet 4 and the bottom. Valve tappet 4 in sections along its stem is guided in the bottom and top housing sleeve 5b, 5a, to what end the coaxially aligned two valve sleeves 5a, 5b are conformed in sections to the external diameter of the valve tappet 4. Therefore, a sleeve projection 14 whose inside diameter is adapted to the outside diameter of the valve tappet 4 follows at the bottom of the top housing sleeve 5a, with the elastic force transmission element 2 equally extending up to the end surface of the valve tappet 4 into the sleeve projection. The stiff force transmission element 2 that is designed as a plate, disc or piston is disposed on the elastic force transmission element 3 so that the elastic force transmission element 3, in the capacity of a rubber reaction disc, is compressed between the first force transmission element 2 and the bottom of the housing sleeve 5a. When a voltage is applied to the piezoelectric element 1, this produces an adjustment force that acts on the stiff force transmission element, whereby the mass of the elastic force transmission element 3 in the direction of the least mechanical resistance will deform further into the opening of the sleeve projection 14 in order to move the valve tappet 4 constantly in the direction of the valve seat 7 in opposition to the effect of the yielding compression spring 13. The minimum piezoelectric stroke initiated will then be translated in the ratio of the force-applied end surfaces A2, A3 at the second force transmission element 3 to the effect of an increased valve tappet stroke, for what reason the end surface A2 of the second force transmission element 3 disposed at the sleeve projection 14 is considerably smaller than the end surface A3 of the second force transmission element 3 that is acted upon by the first force transmission element 2.

Abutment of the valve closure member 6 on the valve seat 7 automatically interrupts the pressure fluid connection between the pressure fluid opening 15 arranged in the bottom of the housing sleeve 5b and the second pressure fluid opening 16 arranged above the valve closure member 6 in the housing wall.

Instead of using the elastic force transmission element 3, it would also be feasible to use a filling with a liquid such as silicone oil, or a like fluid, however, this arrangement would require sealing provisions at the boundaries of the fluid in the valve housing 5 in order to prevent fluid loss and/or different fluids from intermingling.

Valve housing 5 and cover 24 are simply made in the illustrated contour by deepdrawing from light-gauge steel sheets.

Different from FIG. 1, FIG. 2 shows a valve closed in its basic position, which has been realized in construction in an amazingly simple fashion by slight constructive modifications of the valve presented in FIG. 1. To this end the arrangement of the valve tappet 4, the two force transmission elements 2, 3 and the piezoelectric element 1 known from FIG. 1 may be maintained for the valve of FIG. 2 as well. Cover 24 may also be taken identically from FIG. 1. There is only a slight modification of the arrangement of the compression spring 13 and the deepdrawn sleeve projection 14 that is now pointing in opposite direction to the compression spring 13 inserted in the first force transmission element 2. For this purpose the first force transmission element 2 as a piston is equipped with a central blind-end bore 18 having a bore diameter that is adapted to the outside diameter of the tappet collar 17 on which the compression spring 13 is supported. Valve tappet 4 comprises a sleeve whose end that is bent off by 180 degrees to form a tappet collar 17 bears against a small annular end surface of the second force transmission element 3, while the coil end of the compression spring 13 directed to the valve tappet 4 rests on the outside radius of the angled-off portion. When the piezoelectric element 1 is electrically energized, its slight expansion leads to a simultaneous stroke of the first force transmission element 2 in the direction of the elastic force transmission element 3 whose mass, due to being embedded in the rigid valve housing 5, is able to escape exclusively in the direction of the tappet collar 17 preloaded by the compression spring 13, with the result that deformation of the force transmission element 3 in the direction of the tappet collar 17 will lift the valve closure member 6 at the valve tappet 4 from its valve seat 7 and, hence, open the pressure fluid connection within the valve. Thus, also in the valve of FIG. 2 the initiated minimum piezoelectric stroke in the ratio of the applied end surfaces at the second force transmission element 3 is translated to the end of an increased valve tappet stroke, for what reason the annular end surface of the second force transmission element 3, which end surface is deformable in the sleeve projection 14 in the direction of the tappet collar 17, is considerably smaller than the annular end surface of the second force transmission element 3 that is acted upon by the first force transmission element 2.

If any details illustrated in FIG. 2 are not referred to, they nevertheless correspond to the description of the subject matter in FIG. 1.

Figure 3:
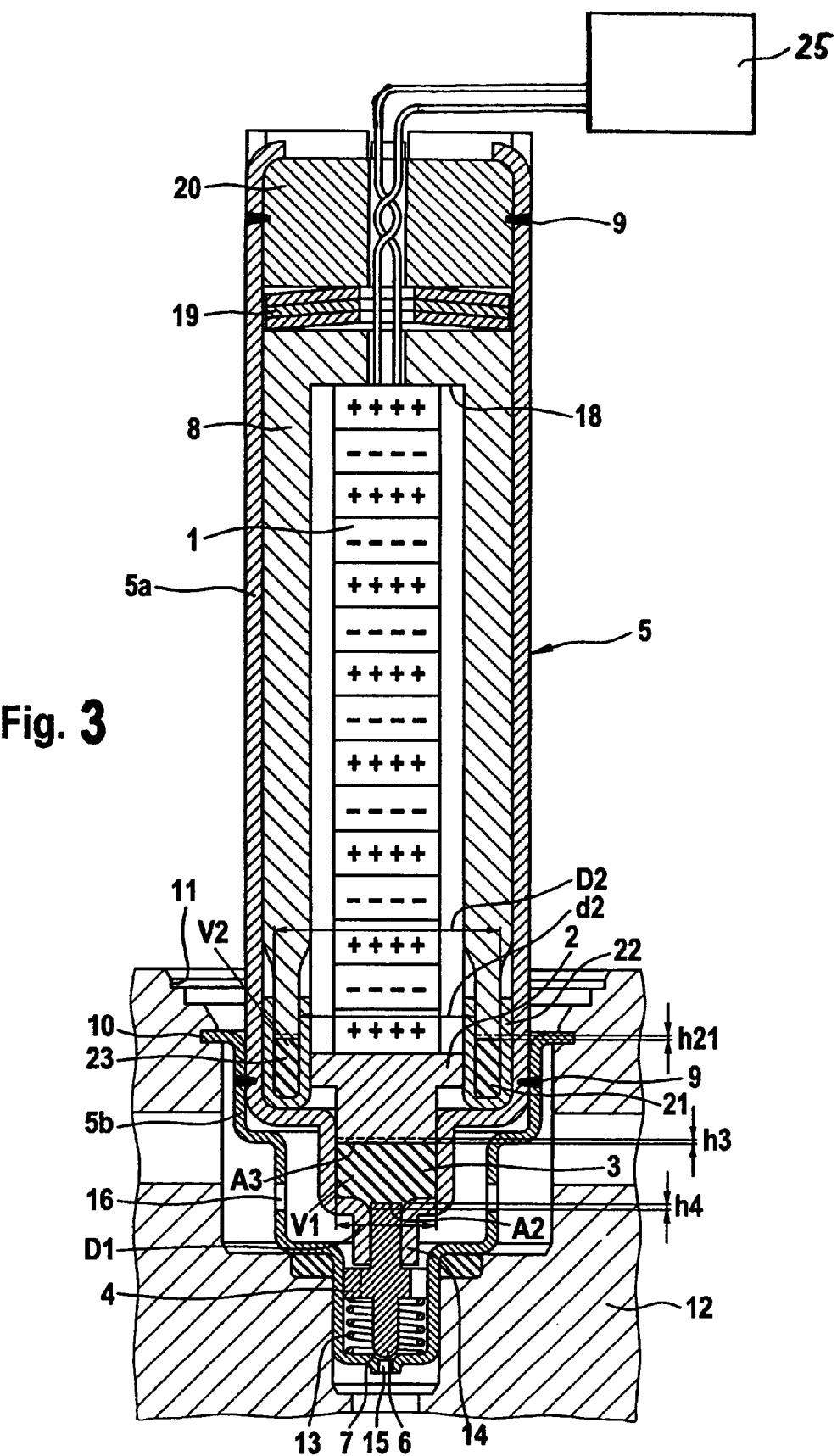
FIG. 3 shows a third embodiment of the invention for a valve opened in its basic position and equipped with temperature-compensating means.

The valve illustrated in a considerably enlarged cross-sectional view in FIG. 3 has a valve tappet 4 that is guided in a valve housing 5 and includes a valve closure member 6 at one end. Valve closure member 6 faces a valve seat 7 integrated in the valve housing 5, with the valve closure member 6 being indirectly actuated by means of a piezoelectric element 1. For this purpose, a first and a second force transmission element 2, 3 is arranged between the piezoelectric element 1 and the valve tappet 4, the said first force transmission element 2 being preferably made of a metal material of high strength that elastically deforms the second force transmission element 3 and moves it in the direction of the valve tappet 4 when the piezoelectric element 1 is activated electrically. For the mechanical translation of the piezoelectric element's movement in the direction of the valve tappet 4, the contact surface A2 of the second force transmission element 3 abutting on the end surface of the valve tappet 4 is smaller than the contact surface A3 of the first force transmission element 2 that is elastically deformable for the infinitely variable translation, the contact surface A3 abutting on the first force transmission element 2. In addition, the initially mentioned construction permits that the second force transmission element 3 seals the hydraulically applied inside area of the valve housing 5 in relation to the dry inside area of the valve housing 5 in a simple and absolutely safe fashion, to what end the second force transmission element 3 is favorably made of an elastomer, e.g., a conventional rubber reaction disc, or a silicone cushion. The second force transmission element 3 may be preloaded in a particularly simple way by choosing the adjustment depth of the piezoelectric element 1 in the valve housing 5 in order to achieve the necessary sealing effect of the second force transmission element 3 and the desired basic adjustment of the valve tappet 4. To this end, the piezoelectric element 1 is supported with its end surface remote from the first force transmission element 2 on a compensating piston 8 guided in the valve housing 5, said piston 8 being acted upon by a stiff cup spring assembly 19 for the basic adjustment of the piezoelectric element 1 in the valve housing 5, the assembly in turn bearing against a closure plug 20 inserted into the valve housing 5. After completion of the basic adjustment, the closure plug 20 is, e.g., welded to the top sleeve portion of the valve housing 5. Of course, operative and/or form-locking arresting provisions for the closure plug 20 are also possible.

For the compensation of thermally induced volume variations of the elastic force transmission element 3, the compensating piston 8, on the other hand, is arranged so as to be slidable between the cup spring assembly 19 and an elastic mass 23 fixed at the bottom of the stepped first housing sleeve 5a. The elastic mass 23 is embedded as a compensating ring 21 in a compensating bowl 22 in a structurally simple fashion so that customary elastomeric rings may also be used. Corresponding to the geometry of the compensating ring 21, the compensating piston 8 is configured as an annular piston accommodating in its cavity the piezoelectric element 1 as a piezo block in a stack-type construction. For the purpose of contacting the compensating ring 21, the piston skirt of the compensating piston 8 extends over the overall height of the piezo block until to the compensating ring 21 in the compensating bowl 22. The first force transmission element 2 is configured as a piston guided along the inside wall of the annular compensating bowl 22 and being thus arranged in a vertical direction between the piezoelectric element 1 and the second force transmission element 3.

The valve housing 5 comprises the two housing sleeves 5a, 5b joined together in sections and being interconnected in the joining zone by means of a welded joint 9. The bottom, second housing sleeve 5b is designed as a stepped housing bowl having its edge 10 that is bent off outwards at right angles wedged into the stepped accommodating bore 11 of a block-shaped valve support member 12. The housing bowl includes at its bottom a first pressure fluid opening 15 with the valve seat 7 that is, e.g., made in a stamping process. By means of compression spring 13 compressed between the stepped valve tappet 4 and the bottom, the hemispherical valve closure member 6 adopts its initial position lifted from the valve seat 7. Valve tappet 4 is guided in sections along its stem in the bottom and the top housing sleeve 5b, 5a, to what end the coaxially aligned two housing sleeves 5a, 5b are adapted in sections to the outside diameter of the valve tappet 4. Following at the bottom of the top first housing sleeve 5a is therefore a sleeve projection 14 that is adapted in its inside diameter to the outside diameter of the valve tappet 4, with equally the elastic force transmission element 3 extending into the sa projection until the end surface of the valve tappet 4. Disposed on the elastic force transmission element 3 is the stiff force transmission element 2 designed as a stepped piston and having its piston wall guided in sections both along the inside surface of the compensating bowl 22 and the inside surface of the stepped housing sleeve 5a. The elastic force transmission element 3 is compressed in the way of a rubber reaction disc between the transversally movable first force transmission element 2 and the annular surface at the bottom of the stepped housing sleeve 5a.

When a voltage is applied to the piezoelectric element 1, the piezoelectric element 1 produces an adjustment force that acts upon the stiff force transmission element 2, whereby the mass of the elastic force transmission element 3 is displaced in the direction of the least mechanical resistance further into the opening of the sleeve projection 14 shaped at the bottom of housing sleeve 5a in order to steadily move the valve tappet 4 acted upon by the second force transmission element 3 in the sleeve projection 14 in opposition to the effect of the resilient compression spring 13 in the direction of the valve seat 7. The electrically initiated minimum piezoelectric stroke is then translated in the ratio of the force-applied end surfaces A2, A3 at the second force transmission element 3 to the effect of an increased valve tappet stroke, for what reason the end surface A2 of the second force transmission element 3, which surface A2 is determined by the opening cross-section of the sleeve projection 14, is chosen to be substantially smaller than the end surface A3 of the second force transmission element 3 acted upon by the first force transmission element 2.

When the valve closure member 6 abuts on the valve seat 7, the pressure fluid connection between the pressure fluid opening 15 arranged at the bottom of the second housing sleeve 5b and the second pressure fluid opening 16 arranged in the housing wall above the valve closure member 6 is automatically interrupted.

For compensation of temperature-responsive length variations, the piezoelectric element 1 is arranged between the first force transmission element 2 and an elastically preloaded compensating piston 8, whose position is influenced by the physical properties of the elastic mass 23 fixed in the valve housing 5.

The physical property of the elastic mass 23, in particular its temperature-responsive volume variation, therefore corresponds to the physical property of the second force transmission element 3 which is elastically compressed in a suitable fashion between the first force transmission element 2 and the bottom of the valve housing 5 for the linear translation of the piezoelectric stroke.

Consequently, the valve is equipped with a compensating mechanism in order to compensate the thermal expansion of the elastic force transmission element 3 because the comparatively high coefficient of heat expansion of the elastomers used for the force transmission element 3 would impair the relatively small valve stroke. This temperature-responsive compensation of expansion is effected in terms of construction by the compensating ring 21 that is favorably made of the material of the elastic force transmission element 3.

This is because the thermal expansion of the compensating ring 21 causes displacement of the compensating piston 8 towards the stiffly preloaded cup spring assembly 19 by the stroke h21, with the result that the thermally induced stroke h3 of the force transmission element 3 is compensated without effecting any undesirable change of the valve stroke h4 that can be achieved by means of the steady mechanical translation.

The volume V2 of the compensating ring 21 must therefore be fixed for compensating the temperature-responsive volume variation at the elastic force transmission element 3 according to the following formula:

$$V2 = [V1 \times (D2^2 - d2^2)] / D1^2$$

The references in this formula mean:

V1 volume of the elastic force transmission element 3

D1 outside diameter of the elastic force transmission element

V2 volume of the compensating ring 21

D2 outside diameter of the compensating ring 21 d2 inside diameter of the compensating ring 21

Instead of using an elastomer as elastic mass 23, admittedly, it would be possible to use a filling with a liquid such as silicone oil, or a like fluid. However, such a provision would require an additional sealing at the boundaries of the liquid in the valve housing 5 in order to prevent fluid loss and/or different fluids from intermingling.

The two-part valve housing 5 and the compensating bowl 22 are deepdrawn from thin sheet metal simply in the illustrated step contour.

In the closed position of the valve closure member 6, the suggested design of the valve additionally enables sensing the hydraulic pressure prevailing at the valve closure member, because there is a hydraulic response to the piezoelectric element 1 by way of the two force transmission elements 2, 3, with the electric voltage variation of the piezoelectric element resulting from the mechanical compressive load application being converted into a pressure value by means of an electronic evaluating unit 25.

The invention claimed is:

1. A valve comprising:
  a valve tappet guided in a valve housing and including a valve closure member;
  a valve seat facing the valve closure member; and
  a piezoelectric element for actuating the valve closure member,
  wherein a first and a second force transmission element is interposed between the piezoelectric element and the valve tappet,
  wherein the first force transmission element is made of a high-strength material which elastically deforms the second force transmission element in the direction of the valve tappet when the piezoelectric element is activated electrically, and
  wherein for sensing the hydraulic pressure by way of the two force transmission elements, the pressure applied to the valve closure member acts on the piezoelectric element, and the electric change in voltage of the piezoelectric element resulting from mechanical deformation is converted into a pressure value by means of an electronic evaluating unit.

2. The valve as claimed in claim 1, wherein for the mechanic translation of the piezoelectric movement onto the valve tappet, a contact surface of the second force transmission element that abuts on the end surface of the valve tappet is smaller than a contact surface of the second force transmission element that abuts on the first force transmission element.

3. The valve as claimed in claim 1, wherein the second force transmission element seals the hydraulically applied inside area of the valve housing in relation to the dry inside area of the valve housing.

4. The valve as claimed in claim 1, wherein the second force transmission element is composed of an elastomer or a silicone.

5. The valve as claimed in claim 1, wherein the second force transmission element is preloaded by choosing the adjustment depth of the piezoelectric element in the valve housing.

6. The valve as claimed in claim 1, wherein the piezoelectric element is supported with its end surface remote from the first force transmission element on a cover that closes the valve housing and is displaceable for adjusting the piezoelectric element in the valve housing.

7. Valve as claimed in claim 1, wherein the piezoelectric element is configured as a piezo block in a stack-type construction, and in that the first force transmission element is configured as a piston that is guided along the inside wall of the valve housing and bears against the second force transmission element designed as a cushion.

8. The valve as claimed in claim 1, wherein the second force transmission element is composed of a silicone cushion.

9. Valve as claimed in claim 1, wherein the piezoelectric element is arranged between the first force transmission element and an elastically preloaded compensating piston, whose position is influenced by the physical properties of an elastic mass fixed in the valve housing.

10. Valve as claimed in claim 9, wherein the physical properties of the elastic mass correspond to the physical properties of the second force transmission element which is elastically compressed between the first force transmission element and the bottom of the valve housing.

11. Valve as claimed in claim 9, wherein the elastic mass is embedded as a compensating ring into an annular compensating bowl that is supported on a bottom of a housing step of the valve housing.

12. Valve as claimed in claim 9, wherein the compensating piston is designed as an annular piston which points with its open end portion into a compensating bowl and is pressed there onto a elastic mass by the action of an elastic preloading force.

13. Valve as claimed in claim 12, wherein a cup spring assembly produces the preloading force active on the compensating piston, with the cup spring assembly being compressed between the closed bottom of the compensating piston and a closure plug arranged at the end of the sleeve-shaped valve housing.

14. Valve as claimed in claim 9, wherein the first force transmission element is designed as a piston having its piston skirt guided in the opening of a annular compensating bowl, and in that the first force transmission element plunges into the opening of the valve housing wherein a elastically deformable second force transmission element is inserted in a fluid-impermeable fashion.

15. Valve as claimed in claim 9, wherein the elastic mass is composed of a rubber reaction disc and the second force transmission element is composed of a rubber ring.

16. Valve as claimed in claim 9, wherein the valve housing comprises two first and second housing sleeves that are jointed in sections into one another at their ends, with the housing sleeve including a piezoelectric element being grouped with the two force transmission elements, a compensating ring, a compensating bowl, the compensating piston, and a closure plug to form an independent assembly.

17. Valve as claimed in claim 16, wherein a compression spring and a valve tappet are mounted between the two housing sleeves, with the valve tappet at the portion remote from a valve seat in the valve housing being guided in a sleeve projection at the first housing sleeve.

18. Valve as claimed in claim 9, wherein for the purpose of mechanical transmission of the piezoelectric movement onto the valve tappet, the contact surface of the second force transmission element that abuts on the end surface of the valve tappet is smaller than the contact surface of the second force transmission element, said contact surface abutting on the first force transmission element.

19. The valve as claimed in claim 2, wherein the second force transmission element seals the hydraulically applied inside area of the valve housing in relation to the dry inside area of the valve housing.

20. A valve comprising:
a valve tappet guided in a valve housing and including a valve closure member;
a valve seat facing the valve closure member;
a piezoelectric element for actuating the valve closure member;
a first force transmission element interposed between the piezoelectric element and the valve tappet and abutting the piezoelectric element;
a second force transmission element interposed between the piezoelectric element and the valve tappet and abutting the valve tappet, wherein the first force transmission element is made of a high-strength material which elastically deforms the second force transmission element in the direction of the valve tappet when the piezoelectric element is activated electrically; and
an electronic evaluating unit responsive to the piezoelectric element,
wherein the electronic evaluating unit measures the electric change in voltage of the piezoelectric element and converts it into a pressure value for sensing the hydraulic pressure applied to the valve closure member.

* * * * *